(12) United States Patent
Chae

(10) Patent No.: US 11,422,566 B2
(45) Date of Patent: Aug. 23, 2022

(54) ARTIFICIAL INTELLIGENCE ROBOT CLEANER

(71) Applicant: LG ELECTRONICS INC., Seoul (KR)

(72) Inventor: Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 313 days.

(21) Appl. No.: 16/563,561

(22) Filed: Sep. 6, 2019

(65) Prior Publication Data
US 2020/0019180 A1 Jan. 16, 2020

(30) Foreign Application Priority Data
Jul. 31, 2019 (KR) ........................ 10-2019-0093516

(51) Int. Cl.
G05D 1/02 (2020.01)
B25J 11/00 (2006.01)

(52) U.S. Cl.
CPC ........ G05D 1/0221 (2013.01); B25J 11/0085 (2013.01); G05D 1/027 (2013.01); G05D 1/0248 (2013.01); G05D 1/0274 (2013.01); G05D 2201/0215 (2013.01)

(58) Field of Classification Search
CPC .... G05D 1/0221; G05D 1/0248; G05D 1/027; G05D 1/0274; G05D 2201/0215; G05D 1/0219; G05D 1/0246; B25J 11/0085; B25J 19/023; A47L 9/2826; A47L 9/2847; A47L 9/2852; A47L 9/2857; A47L 2201/04; A47L 2201/06; A47L 11/4011
See application file for complete search history.

(56) References Cited

U.S. PATENT DOCUMENTS

| 9,233,472 | B2 * | 1/2016 | Angle | G06Q 20/202 |
| 9,974,422 | B2 * | 5/2018 | Lee | A47L 9/2894 |
| 10,102,429 | B2 * | 10/2018 | Schnittman | G06K 9/66 |
| 10,750,919 | B2 * | 8/2020 | Luo | A47L 11/14 |
| 10,878,294 | B2 * | 12/2020 | Jones | G06K 9/4628 |

(Continued)

FOREIGN PATENT DOCUMENTS

| CN | 108021884 A | * 5/2018 | .......... A47L 11/24 |
| CN | 109497893 A | * 3/2019 | |

(Continued)

OTHER PUBLICATIONS

Korean Intellectual Property Office Application Serial No. 10-2019-0093516, Office Action dated Nov. 24, 2020, 5 pages.

*Primary Examiner* — Angelina Shudy
(74) *Attorney, Agent, or Firm* — Lee, Hong, Degerman, Kang & Waimey PC

(57) ABSTRACT

An artificial intelligence robot cleaner is provided. The artificial intelligence robot cleaner includes a driving unit configured to drive the artificial intelligence robot cleaner, a cleaning unit configured to remove contaminant, a rear camera configured to photograph a rear area of the artificial intelligence robot cleaner, and a processor configured to determine whether cleaning of an already cleaned area is completed by using the image of the rear area of the artificial intelligence robot cleaner, and if the cleaning is not completed, control the driving unit and the cleaning unit to reclean the area where the cleaning is not completed.

7 Claims, 15 Drawing Sheets

(56) References Cited

U.S. PATENT DOCUMENTS

| | | | | |
|---|---|---|---|---|
| 2002/0153184 | A1* | 10/2002 | Song | G05D 1/0282 180/167 |
| 2005/0022330 | A1* | 2/2005 | Park | A47L 7/0061 15/319 |
| 2010/0288307 | A1* | 11/2010 | Chung | G05D 1/0272 134/18 |
| 2012/0103367 | A1* | 5/2012 | Tang | G05D 1/0246 134/18 |
| 2014/0121881 | A1* | 5/2014 | Diazdelcastillo | G05D 1/0265 701/23 |
| 2014/0124004 | A1* | 5/2014 | Rosenstein | G05D 1/0219 15/3 |
| 2014/0207282 | A1* | 7/2014 | Angle | G05B 15/02 700/257 |
| 2014/0214205 | A1* | 7/2014 | Kwon | A47L 11/4011 700/258 |
| 2015/0052703 | A1* | 2/2015 | Lee | A47L 9/2815 701/28 |
| 2016/0135655 | A1* | 5/2016 | Ahn | G05D 1/0044 134/56 R |
| 2016/0144512 | A1* | 5/2016 | Kim | G06T 7/521 348/46 |
| 2016/0278599 | A1* | 9/2016 | Seo | A47L 11/4011 |
| 2016/0302639 | A1* | 10/2016 | Lindhé | G05D 1/0248 |
| 2017/0332866 | A1* | 11/2017 | Nam | A47L 9/04 |
| 2018/0242808 | A1* | 8/2018 | Jung | A47L 11/408 |
| 2019/0191950 | A1* | 6/2019 | Luo | A47L 1/02 |
| 2019/0227566 | A1* | 7/2019 | Marutani | A47L 9/2852 |
| 2019/0298139 | A1* | 10/2019 | Takaoka | A47L 11/4066 |
| 2019/0365176 | A1* | 12/2019 | Kim | G05D 1/0212 |
| 2020/0375427 | A1* | 12/2020 | Huang | G05D 1/0221 |
| 2021/0114213 | A1* | 4/2021 | Lee | A47L 9/2805 |
| 2021/0121035 | A1* | 4/2021 | Kim | G05D 1/0219 |
| 2021/0243386 | A1* | 8/2021 | Park | H04N 5/2628 |

FOREIGN PATENT DOCUMENTS

| | | | | |
|---|---|---|---|---|
| CN | 111374597 A | * | 7/2020 | A47L 11/24 |
| FR | 2823869 A1 | * | 10/2002 | A47L 9/0063 |
| KR | 2008006074 A | * | 1/2008 | A47L 9/2857 |
| KR | 2011088184 A | * | 8/2011 | A47L 11/24 |
| KR | 101212873 | | 12/2012 | |
| KR | 2013027355 A | * | 3/2013 | A47L 9/0488 |
| KR | 20150065972 | | 6/2015 | |
| KR | 20160089835 | | 7/2016 | |

* cited by examiner (a)

(b)

(a)

(b)

(a)

(b)

(a)

(b)

(a)

(b)

(c)

(a)

(b)

(a)

(b)

ARTIFICIAL INTELLIGENCE ROBOT CLEANER

CROSS-REFERENCE TO RELATED APPLICATIONS

Pursuant to 35 U.S.C. § 119(a), this application claims the benefit of earlier filing date and right of priority to Korean Patent Application No. 10-2019-0093516, filed on Jul. 31, 2019, the contents of which are hereby incorporated by reference herein in its entirety.

BACKGROUND

The present invention relates to an artificial intelligence robot cleaner capable of determining whether cleaning of an already cleaned area is completed and performing recleaning if the cleaning is not completed.

Artificial intelligence is one field of computer engineering and information technology for studying a method of enabling a computer to perform thinking, learning, and self-development that can be performed by human intelligence and may denote that a computer imitates an intelligent action of a human.

Moreover, artificial intelligence is directly or indirectly associated with the other field of computer engineering without being individually provided. Particularly, at present, in various fields of information technology, an attempt to introduce artificial intelligence components and use the artificial intelligence components in solving a problem of a corresponding field is being actively done.

Meanwhile, techniques for perceiving and learning the surrounding situation by using artificial intelligence and providing information desired by the user in a desired form, or performing an operation or function desired by the user are being actively studied.

An electronic device that provides such various operations and functions may be referred to as an artificial intelligence device.

Meanwhile, a current robot cleaner only sets a moving route of the robot cleaner, travels through the set moving route, and performs cleaning, and does not consider whether the cleaning is completed.

For example, even if the robot cleaner has performed cleaning, the cleaning may not be performed properly and residual contaminants may remain. However, even in such a case, since the robot cleaner performs cleaning while traveling through the set moving route, a problem that residual contaminants remain may occur.

SUMMARY

The present invention has been made in an effort solve the above problems, and an object of the present invention is to provide an artificial intelligence robot cleaner capable of determining whether cleaning of an already cleaned area is completed and performing recleaning if the cleaning is not completed.

In one embodiment, an artificial intelligence robot cleaner includes: a driving unit configured to drive the artificial intelligence robot cleaner; a cleaning unit configured to remove contaminant; a rear camera configured to photograph a rear area of the artificial intelligence robot cleaner; and a processor configured to: determine whether cleaning of an already cleaned area is completed by using the image of the rear area of the artificial intelligence robot cleaner; and if the cleaning is not completed, control the driving unit and the cleaning unit to reclean the area where the cleaning is not completed.

The details of one or more embodiments are set forth in the accompanying drawings and the description below. Other features will be apparent from the description and drawings, and from the claims.

DETAILED DESCRIPTION OF THE EMBODIMENTS

Figure 1:
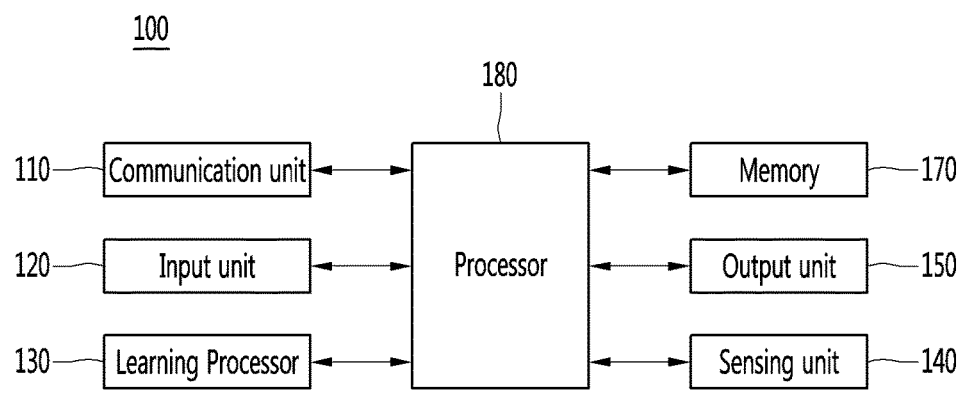
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
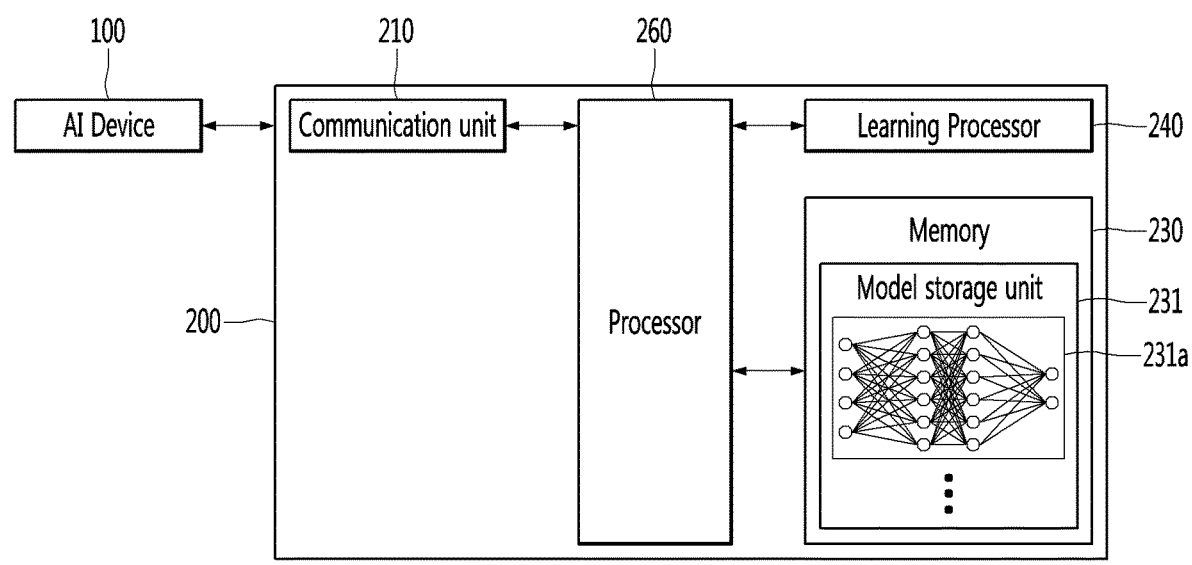
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
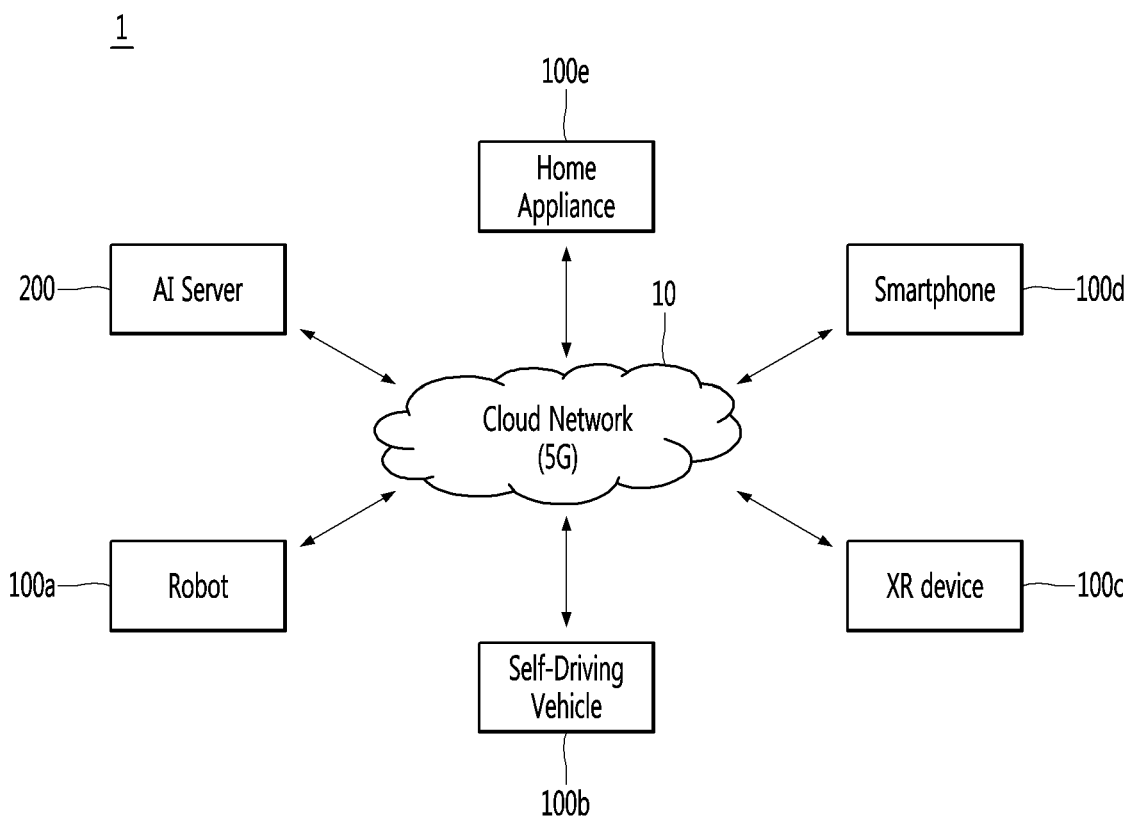
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4A:
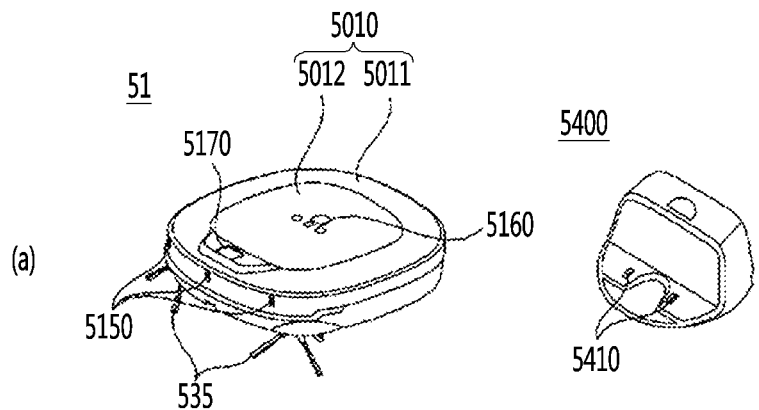
FIG. 4A is a perspective view of a robot cleaner according to an embodiment of the present invention.
Figure 4A:
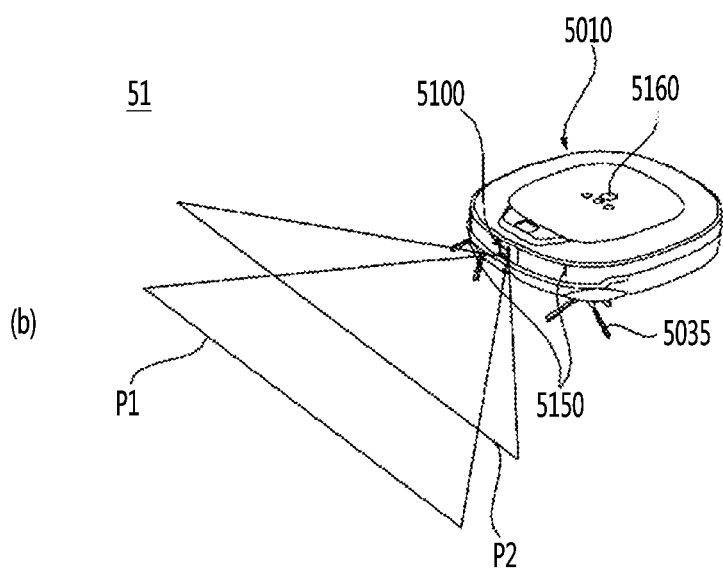
Figure 4B:
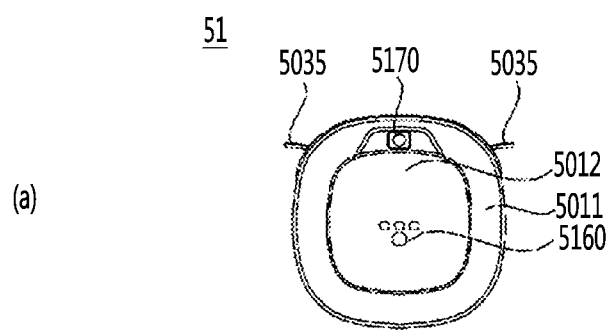
FIG. 4B illustrates a horizontal angle of view of the robot cleaner of FIG. 4A.
Figure 4B:
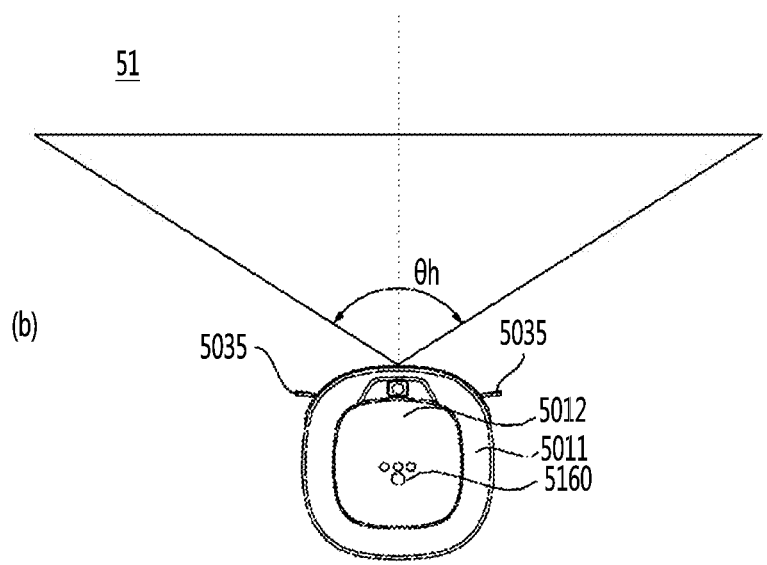
Figure 4C:
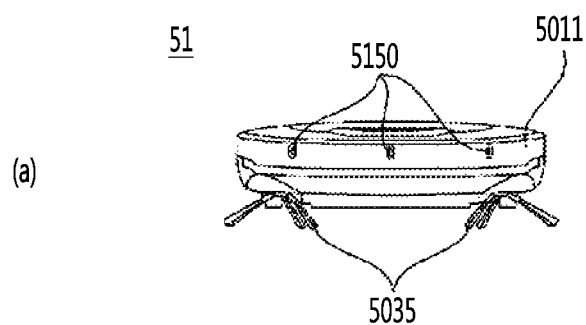
FIG. 4C is a front view of the robot cleaner of FIG. 4A.
Figure 4C:
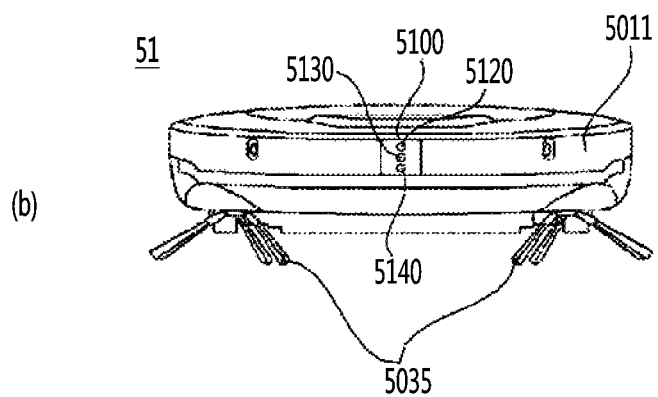
Figure 4D:
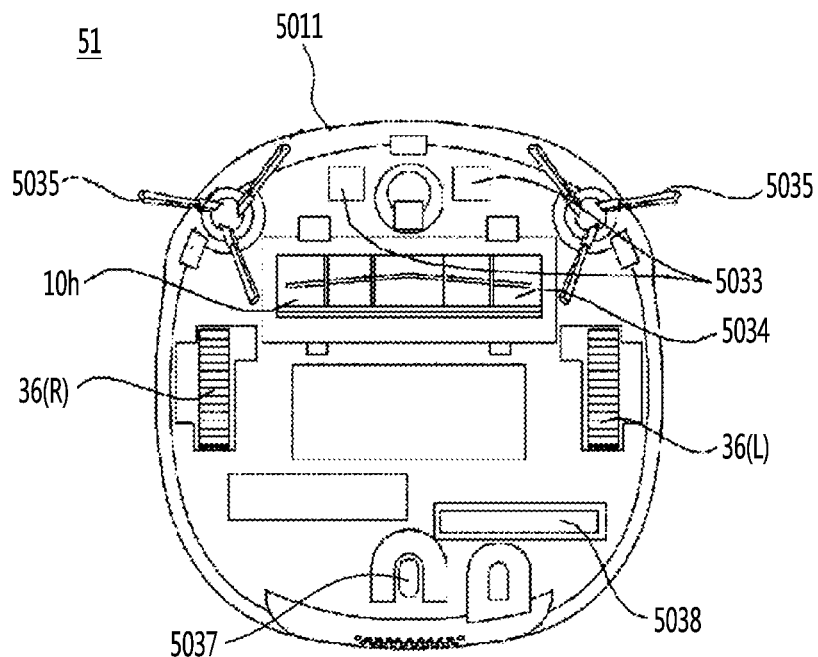
FIG. 4D illustrates the bottom of the robot cleaner of FIG. 4A.

FIG. 4A is a perspective view of a robot cleaner according to an embodiment of the present invention. FIG. 4B illustrates a horizontal angle of view of the robot cleaner of FIG. 4A. FIG. 4C is a front view of the robot cleaner of FIG. 4A. FIG. 4D illustrates the bottom of the robot cleaner of FIG. 4A.

Referring to FIGS. 4A to 4D, a robot cleaner 51 according to an embodiment of the present invention a main body 5010 that moves along a floor of a cleaning area and suctions foreign substances such as dust on the floor, and an obstacle detection unit 5100 disposed in front of the main body 5010.

The main body 5010 may include a casing 5011 forming an appearance and defining a space in which components constituting the main body 5010 are accommodated, a suction unit 5034 disposed in the casing 5011 to suction foreign substances such as dust or garbage, and a left wheel 36(L) and a right wheel 36(R) rotatably provided in the casing 5011. As the left wheel 36(L) and the right wheel 36(R) rotate, the main body 5010 moves along the floor of the cleaning area. In this process, foreign substances are suctioned through the suction unit 5034.

The suction unit 5034 may include a suction fan (not shown) for generating a suction force and a suction port 10h through which air flow generated by the rotation of the suction fan is suctioned. The suction unit 5034 may include a filter (not shown) for collecting foreign substances from the air flow suctioned through the suction port 10h, and a foreign substance collection container (not shown) in which foreign substances collected by the filter are accumulated.

In addition, the main body 5010 may include a driving unit for driving the left wheel 36(L) and the right wheel 36(R). The driving unit may include at least one driving motor. The at least one driving motor may include a left wheel driving motor for rotating the left wheel 36(L) and a right wheel driving motor for rotating the right wheel 36(R).

The left wheel driving motor and the right wheel driving motor may be independently controlled by a traveling control unit of a control unit to achieve forward movement, backward movement, or rotation. For example, if the main body 5010 travels straight, the left wheel driving motor and the right wheel driving motor rotate in the same direction. However, if the left wheel driving motor and the right wheel driving motor rotate at different speeds or rotate in opposite directions, the traveling direction of the main body 5010 may be switched. At least one auxiliary wheel 5037 may be further provided for stably supporting the main body 5010.

A plurality of brushes 5035 disposed on the front side of the bottom of the casing 5011 and having a brush with a plurality of radially extending wings may be further provided. Dusts are removed from the floor of the cleaning area by the rotation of the plurality of brushes 5035. The dusts separated from the floor are suctioned through the suction port 10h and collected in the collection container.

A control panel including an operation unit 5160 for receiving various commands for controlling the robot cleaner 51 from the user may be provided on the upper surface of the casing 5011.

The obstacle detection unit 5100 may be disposed in front of the main body 5010.

The obstacle detection unit 5100 is fixed to the front surface of the casing 5011 and includes a first pattern irradiation unit 5120, a second pattern irradiation unit 5130, and an image acquisition unit 5140. In this case, the image acquisition unit 5140 is basically installed below the pattern irradiation unit as shown, but in some cases, may be disposed between the first and second pattern irradiation unit. In addition, a second image acquisition unit (not shown) may be further provided at the upper end of the main body. The second image acquisition unit captures an image of the upper end of the main body, that is, the ceiling.

The main body 5010 is provided with a rechargeable battery 5038. A charging terminal 5033 of the battery 5038 is connected to a commercial power source (for example, a power outlet in a home), or the main body 5010 is docked on a separate charging station (not shown) connected to the commercial power source. In this manner, the charging terminal 5033 is electrically connected to the commercial power source, thereby achieving the charging of the battery 5038. Electrical components constituting the robot cleaner 51 may receive power from the battery 5038. Therefore, if the battery 5038 is in a charged state, the robot cleaner 51 may be traveled by itself in a state in which the battery 5038 is electrically separated from the commercial power source.

Figure 4E:
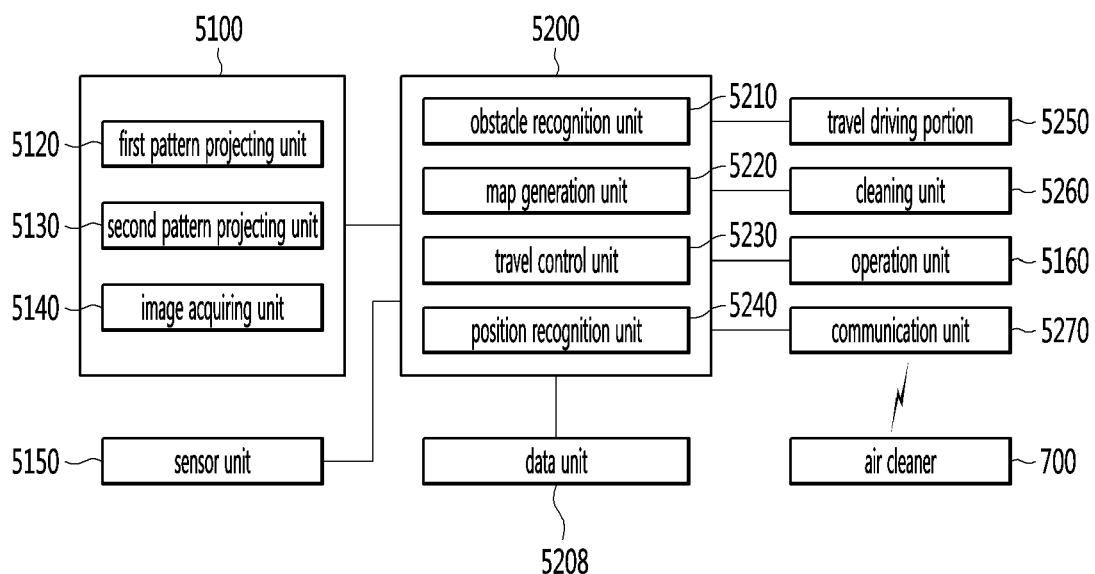
FIG. 4E is a block diagram illustrating the main parts of the robot cleaner according to an embodiment of the present invention.

FIG. 4E is a block diagram illustrating the main parts of the robot cleaner according to an embodiment of the present invention.

As shown in FIG. 4E, the robot cleaner 51 may include a control unit 5200 for controlling a driving unit 5250, a cleaning unit 5260, a data unit 5280, an obstacle detection unit 5100, a sensor unit 5150, a communication unit 5270, an operation unit 5160, and an overall operation. The control unit may be implemented by one or more microprocessors, and may be implemented by a hardware device.

The operation unit 5160 may include an input unit such as at least one button, a switch, or a touch pad, and may receive a user command. As described above, the operation unit may be provided at the upper end of the main body 5010.

The data unit 5280 stores an obstacle detection signal input from the obstacle detection unit 5100 or the sensor unit 5150, stores reference data for allowing the obstacle recognition unit 5210 to determine the obstacle, and stores obstacle information about the detected obstacle. In addition, the data unit 5280 stores control data for controlling the operation of the robot cleaner and data according to the cleaning mode of the robot cleaner, and stores a map including obstacle information generated by a map generation unit. The data unit 5280 may store a base map, a cleaning map, a user map, and a guide map. The obstacle detection signal includes a detection signal such as an ultrasonic wave/laser by the sensor unit and an acquired image of the image acquisition unit.

In addition, the data unit 5280 stores data that can be read by a microprocessor. The data unit 5280 may include hard disk drive (HDD), solid state disk (SSD), silicon disk drive (SDD), ROM, RAM, CD-ROM, magnetic tape, floppy disk, and optical data storage devices.

The communication unit 5270 communicates with the air cleaner in a wireless communication manner. In addition, the communication unit 5270 may be connected to an Internet network through a home network to communicate with an external server or an air cleaner.

The communication unit 5270 transmits the generated map to the air cleaner, and transmits data related to the operation state of the robot cleaner and the cleaning state to the air cleaner. The communication unit 5270 includes a communication module such as Wi-Fi or WiBro, as well as short-range wireless communication such as Zigbee or Bluetooth, and transmits and receives data.

The driving unit 5250 includes at least one driving motor to allow the robot cleaner to travel according to the control command of the traveling control unit 5230. As described above, the driving unit 5250 may include the left wheel driving motor for rotating the left wheel 36(L) and the right wheel driving motor for rotating the right wheel 36(R).

The cleaning unit 5260 operates the brush to make a state in which dusts or foreign substances around the robot cleaner can be easily suctioned, and operates the suction device to suction dusts or foreign substances. The cleaning unit 5260 controls the operation of the suction fan provided in the suction unit 34 for suctioning the foreign substances such as dusts or garbage, so that the dusts are introduced into the foreign substance collection container through the suction port.

The obstacle detection unit 5100 includes a first pattern irradiation unit 5120, a second pattern irradiation unit 5130, and an image acquisition unit 5140.

The sensor unit 5150 includes a plurality of sensors to assist in detecting a failure. The sensor unit 5150 may include at least one of a laser sensor, an ultrasonic sensor, or an infrared sensor. The sensor unit 5150 detects an obstacle in front of the main body 5010, that is, a driving direction, by using at least one of laser, ultrasonic waves, or infrared rays. If the transmitted signal is reflected and incident on the sensor unit 5150, the sensor unit 5150 inputs information about the presence or absence of the obstacle or a distance to the obstacle to the control unit 5200 as an obstacle detection signal.

In addition, the sensor unit 5150 includes at least one tilt sensor to detect the tilt of the main body. The tilt sensor calculates the tilted direction and angle if the main body is tilted in the front, rear, left and right directions. The tilt sensor may be a tilt sensor, an acceleration sensor, or the like. In the case of the acceleration sensor, any one of a gyro type, an inertial type, and a silicon semiconductor type may be applied.

Meanwhile, the sensor unit 5150 may include at least one of the components of the obstacle detection unit 5100 and may perform the function of the obstacle detection unit 5100.

In the obstacle detection unit 5100, the first pattern irradiation unit 5120, the second pattern irradiation unit 5130, and the image acquisition unit 5140 are installed in front of the main body 5010 as described above, so that lights P1 and P2 of the first and second patterns are irradiated to the front of the robot cleaner and the lights of the irradiated patterns are captured to obtain the image.

In addition, the sensor unit 5150 may include a dust sensor for detecting the amount of dusts in the air and a gas sensor for detecting the amount of gas in the air.

The obstacle detection unit 5100 inputs the acquired image to the control unit 5200 as an obstacle detection signal.

The first and second pattern irradiation units 5120 and 5130 of the obstacle detection unit 5100 may include a light source and an optical pattern projection element (OPPE) that generates a predetermined pattern by transmitting light emitted from the light source. The light source may be a laser diode (LD), a light emitting diode (LED), or the like. Since laser light is superior to other light sources in terms of monochromaticity, straightness, and connection properties, the distance can be accurately measured. In particular, since infrared or visible light has a problem that a large deviation occurs in the accuracy of distance measurement, depending on factors such as color and material of an object, the laser diode is preferable as the light source. The OPPE may include a lens and a diffractive optical element (DOE). Light of various patterns may be irradiated according to the configuration of the OPPE provided in each of the pattern irradiation units 5120 and 5130.

The first pattern irradiation unit 5120 may irradiate the light P1 of the first pattern (hereinafter, referred to as first pattern light) toward the front lower side of the main body 5010. Therefore, the first pattern light P1 may be incident on the floor of the cleaning area.

The first pattern light P1 may be configured in the form of a horizontal line Ph. In addition, the first pattern light P1 may be configured in the form of a cross pattern in which a horizontal line Ph and a vertical line Pv intersect with each other.

The first pattern irradiation unit 5120, the second pattern irradiation unit 5130, and the image acquisition unit 5140 may be vertically arranged in a line. The image acquisition unit 5140 is disposed below the first pattern irradiation unit 5120 and the second pattern irradiation unit 5130, but the present invention is not limited thereto. The image acquisition unit 5140 may be disposed above the first pattern irradiation unit and the second pattern irradiation unit.

In an embodiment, the first pattern irradiation unit 5120 may be disposed at the upper side and may irradiate the first pattern light P1 downwardly toward the front to detect the obstacle disposed below the first pattern irradiation unit 5120. The second pattern irradiation unit 5130 may be disposed below the first pattern irradiation unit 5120 and may irradiate the light P2 of the second pattern (hereinafter, referred to as second pattern light) upwardly toward the front. Therefore, the second pattern light P2 may be incident on the obstacle or a portion of the obstacle that is disposed at least higher than the second pattern irradiation unit 5130 from the wall or the floor of the cleaning area.

The second pattern light P2 may be formed in a pattern different from that of the first pattern light P1, and preferably includes a horizontal line. The horizontal line is not necessarily a continuous line segment, and may be a dashed line.

Meanwhile, in FIG. 2 described above, the illustrated irradiation angle θh indicates the horizontal irradiation angle of the first pattern light P1 irradiated from the first pattern irradiation unit 5120. Both ends of the horizontal line Ph indicate an angle formed with the first pattern irradiation unit 5120, and are preferably defined in the range of 130° to 140°, but are not necessarily limited thereto. The dashed line shown in FIG. 2 is directed toward the front of the robot cleaner 51, and the first pattern light P1 may be configured to be symmetrical with respect to the dashed line.

Similar to the first pattern irradiation unit 5120, the second pattern irradiation unit 5130 may also have a horizontal irradiation angle, preferably, in the range of 130° to 140°. According to an embodiment, the second pattern light P2 may be irradiated at the same horizontal irradiation angle as that of the first pattern irradiation unit 5120. In this case, the second pattern light P2 may also be configured to be symmetrical with respect to the dashed line shown in FIG. 2.

The image acquisition unit 5140 may acquire an image in front of the main body 5010. In particular, the pattern lights P1 and P2 appear in an image acquired by the image acquisition unit 5140 (hereinafter, referred to as an acquired image). Hereinafter, the images of the pattern lights P1 and P2 shown in the acquired image is referred to as a light pattern. Since the pattern lights P1 and P2 substantially incident on the real space are images formed on the image sensor, the same reference numerals as the pattern lights P1 and P2 are assigned. The images respectively corresponding to the first pattern light P1 and the second pattern light P2 are referred to as the first light pattern P1 and the second light pattern P2.

The image acquisition unit 5140 may include a digital camera that converts an image of an object into an electrical signal, converts the electrical signal into a digital signal, and stores the digital signal in a memory device. The digital camera may include an image sensor (not shown) and an image processor (not shown).

The image sensor is a device that converts an optical image into an electrical signal, and includes a chip in which a plurality of photodiodes are integrated. Examples of the photodiode may include a pixel. Charges are accumulated in each pixel by the image formed on the chip by light passing through the lens, and the charges accumulated in the pixel are converted into an electrical signal (e.g., voltage). As the image sensor, a charge coupled device (CCD), a complementary metal oxide semiconductor (CMOS), and the like are well known.

The image processor generates a digital image based on the analog signal output from the image sensor. The image processor may include an AD converter for converting an analog signal into a digital signal, a buffer memory for temporarily recording digital data according to the digital signal output from the AD converter, and a digital signal processor (DSP) for processing information recorded in the buffer memory to form a digital image.

The control unit 5200 includes an obstacle recognition unit 5210, a map generation unit 5220, a traveling control unit 5230, and a position recognition unit 5240.

The obstacle recognition unit 5210 determines an obstacle based on an acquired image input from the obstacle detection unit 5100, and the traveling control unit 5230 controls the driving unit 5250 to pass through the obstacle or avoid the obstacle by changing the moving direction or the traveling route in response to the obstacle information.

The traveling control unit 5230 controls the driving unit 5250 to independently control the operations of the left wheel driving motor and the right wheel driving motor, so that the main body 5010 travels straight or rotates.

The obstacle recognition unit 5210 stores the obstacle detection signal input from the sensor unit 5150 or the obstacle detection unit 5100 in the data unit 5280, and analyzes the obstacle detection signal to determine the obstacle.

The obstacle recognition unit 5210 determines the presence or absence of the obstacle in front based on the signal of the sensor unit, and analyzes the acquired image to determine the position, the size, and the shape of the obstacle.

The obstacle recognition unit 5210 analyzes the acquired image to extract a pattern. The obstacle recognition unit 5210 extracts a light pattern that appears if the pattern light emitted from the first pattern irradiation unit or the second pattern irradiation unit is irradiated on the floor or the obstacle, and determines the obstacle based on the extracted light pattern.

The obstacle recognition unit 5210 detects the light patterns P1 and P2 from the image acquired by the image acquisition unit 5140 (acquired image). The obstacle recognition unit 5210 may detect features of points, lines, planes, and the like with respect to predetermined pixels constituting the acquired image, and may detect the light patterns P1 and P2 or the points, lines, planes, and the like constituting the light patterns P1 and P2, based on the detected features The obstacle recognition unit 5210 may extract line segments formed by successive pixels brighter than the surroundings, and extract the horizontal line Ph constituting the first light pattern P1 and the horizontal line constituting the second light pattern P2. However, the present invention is not limited thereto. Various techniques for extracting a desired pattern from a digital image are known. The obstacle recognition unit 5210 may extract the first light pattern P1 and the second light pattern P2 by using these known techniques.

In addition, the obstacle recognition unit 5210 determines the presence or absence of the obstacle based on the detected pattern, and determines the shape of the obstacle. The obstacle recognition unit 5210 may determine the obstacle through the first light pattern and the second light pattern, and calculate a distance to the obstacle. In addition, the obstacle recognition unit 5210 may determine the size (height) and the shape of the obstacle by changing the shapes of the first light pattern and the second light pattern and the light pattern appearing while the obstacle approaches.

The obstacle recognition unit 5210 determines the obstacle with respect to the first light pattern and the second light pattern based on the distance from the reference position. If the first light pattern P1 appears at a position lower than the reference position, the obstacle recognition unit 5210 may determine that a downhill slope exists, and if the first light pattern P1 disappears, the obstacle recognition unit 5210 may determine that a cliff exists. In addition, if the second light pattern appears, the obstacle recognition unit 5210 may determine the obstacle in front or the obstacle in the upper portion.

The obstacle recognition unit 5210 determines whether the main body is tilted based on tilt information input from the tilt sensor of the sensor unit 5150. If the main body is tilted, the tilt with respect to the position of the light pattern of the acquired image is compensated.

The traveling control unit 5230 controls the driving unit 5250 to perform the cleaning while traveling through the designated area of the cleaning area and controls the cleaning unit 5260 to perform the cleaning by suctioning the dusts during the traveling.

In response to the obstacle recognized by the obstacle recognition unit 5210, the traveling control unit 5230 controls the driving unit 5250 by setting the traveling route so as to determine whether the robot cleaner is capable of traveling or entering, approach the obstacle to travel, or pass through the obstacle, or avoid the obstacle.

The map generation unit 5220 generates the map for the cleaning area based on the information about the obstacle determined by the obstacle recognition unit 5210.

During the initial operation or if the map of the cleaning area is not stored, the map generation unit 5220 generates the map for the cleaning area based on the obstacle information while traveling through the cleaning area. In addition, the map generation unit 5220 updates the previously generated map based on the obstacle information acquired during traveling.

The map generation unit 5220 generates a base map based on the information acquired by the obstacle recognition unit 5210 during traveling, and generates a cleaning map by dividing an area from the base map. In addition, the map generation unit 5220 generates a user map and a guide map by arranging the area with respect to the cleaning map and setting the attributes of the area.

The base map is a map in which the shape of the cleaning area acquired through the traveling is displayed as an outline, and the cleaning map is a map in which the areas are divided in the base map. The base map and the cleaning map include information about the area where the robot cleaner can travel and the obstacle information. The user map is a map that has a visual effect by simplifying the area of the cleaning map and arranging the outlines. The guide map is a superimposed map of the cleaning map and the user map. Since the cleaning map is displayed on the guide map, a cleaning command may be input based on an area where the robot cleaner can actually travel.

After generating the base map, the map generation unit 5220 may divide the cleaning area into a plurality of areas, include a connection passage connecting the plurality of areas, and generate a map including information about the obstacle in each area. The map generation unit 5220 divides sub-areas so as to distinguish the areas on the map, sets the representative area, sets the separated sub-areas as separate detailed areas, and merges the same into the representative area to generate a map in which the areas are divided.

The map generation unit 5220 processes the shape of the area for each divided area. The map generation unit 5220 sets the attributes to the divided areas and processes the shape of the area according to the attributes for each area.

The map generation unit 5220 preferentially determines the main area in each of the divided areas based on the number of contacts with other areas. The main area is basically a living room, but in some cases, the main area may be changed to any one of a plurality of rooms. The map generation unit 5220 sets attributes to the remaining areas based on the main area. For example, the map generation unit 5220 may set an area having a predetermined size or more arranged around the living room, which is the main area, as a room, and may set the remaining areas as other areas.

In processing the shape of the area, the map generation unit 5220 processes each area to have a specific shape according to a criterion based on the attribute of the area. For example, the map generation unit 5220 processes the shape of the area based on the shape of a general home room, for example, a rectangle. In addition, the map generation unit 5220 expands the shape of the area based on the outermost cell of the base map, and processes the shape of the area by deleting or reducing the area with respect to the area inaccessible due to the obstacle.

In addition, the map generation unit 5220 may display obstacles equal to or greater than a predetermined size on the map according to the size of the obstacle, and may delete obstacles less than the predetermined size from the corresponding cell so that the obstacle is not displayed. For example, the map generation unit displays furniture such as chairs or sofas equal to or greater than a certain size on the map, and deletes temporarily appearing obstacles, small toys, for example, small toys, etc., from the map. The map generation unit 5220 stores the position of the charging station together on the map if the map is generated.

After the map is generated, the map generation unit 5220 may add an obstacle on the map based on the obstacle information input from the obstacle recognition unit 21 with respect to the detected obstacle. If a specific obstacle is repeatedly detected at a fixed position, the map generation unit 5220 adds an obstacle to the map, and if the obstacle is temporarily detected, the map generation unit 5220 ignores the obstacle.

The map generation unit 5220 generates both the user map that is a processed map and the guide map in which the user map and the cleaning map are overlapped and displayed.

In addition, if a virtual wall is set, the map generation unit 5220 sets the position of the virtual wall on the cleaning map based on data related to the virtual wall received through the communication unit, and calculates the coordinates of the virtual wall corresponding to the cleaning area. The map generation unit 5220 registers the virtual wall in the cleaning map as an obstacle.

The map generation unit 5220 stores data related to the set virtual wall, for example, information about the level of the virtual wall and the attribute of the virtual wall.

The map generation unit 5220 enlarges the set virtual wall and registers the same as an obstacle. During traveling, the main body 5010 is set to a wider range by enlarging the virtual wall set so as not to contact or invade the virtual wall.

If the map generation unit 5220 cannot determine the current position of the main body 5010 by the position recognition unit 5240, the map generation unit 5220 generates a new map for the cleaning area. The map generation unit 5220 may determine that the robot cleaner has moved to the new area and initialize the preset virtual wall.

If data related to the virtual wall is received during traveling, the map generation unit 5220 further sets the virtual wall on the map so as to operate in response to the virtual wall if the main body 5010 travels. For example, if a new virtual wall is added, if the level or attribute of the virtual wall changes, or if the position of the preset virtual wall is changed, the map generation unit 5220 updates the map based on the received data so that the information about the changed virtual wall is reflected to the map.

The position recognition unit 5240 determines the current position of the main body 5010 based on the map (cleaning map, guide map, or user map) stored in the data unit.

If the cleaning command is input, the position recognition unit 5240 determines whether the current position of the main body matches the position on the map. If the current position does not match the position on the map, or if the current position cannot be confirmed, the position recognition unit 5240 recognizes the current position and restores the current position of the robot cleaner 51. If the current position is restored, the traveling control unit 5230 controls the driving unit so as to move to the designated area based on the current position. The cleaning command may be input from a remote controller (not shown), the operation unit 5160, or an air cleaner.

If the current position doesn't match the position on the map, or if the current position cannot be confirmed, the position recognition unit 5240 may estimate the current position based on the map by analyzing the acquired image input from the image acquisition unit 5140.

The position recognition unit 5240 processes the acquired image acquired at each position while the map is generated by the map generation unit 5220, and recognizes the entire area of the main body in association with the map.

The position recognition unit 5240 may determine the current position of the main body by comparing the map with the acquired image for each position on the map by using the acquired image of the image acquisition unit 5140. Therefore, even if the position of the main body suddenly changes, the current position can be estimated and recognized.

The position recognition unit 5240 determines the position by analyzing various features, such as the lightings disposed on the ceiling, edges, corners, blobs, and ridges, which are included in the acquired image. The acquired image may be input from an image acquisition unit or a second image acquisition unit provided at the upper end of the main body.

The position recognition unit 5240 detects a feature from each of the acquired images. Various feature detection methods for detecting the features from the image are well known in the field of computer vision technology. Several feature detectors suitable for the detection of these features are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Gray-level blobs detectors.

The position recognition unit 5240 calculates a descriptor based on each feature. The position recognition unit 5240 may convert the feature into the descriptor by using a scale invariant feature transform (SIFT) technique for feature detection. The descriptor may be represented by an n-dimensional vector. SIFT can detect invariant features for scale, rotation, and brightness changes of the subject. Therefore, even if the same area is photographed with different postures of the robot cleaner 51, the feature that is invariant (i.e., rotation-invariant) may be detected. The present invention is not limited thereto, and other various techniques (e.g., HOG: Histogram of Oriented Gradient, Haar feature, Fems, LBP: Local Binary Pattern, MCT: Modified Census Transform) may be applied.

The position recognition unit 5240 may classify at least one descriptor for each acquired image into a plurality of groups according to a predetermined sub-classification rule based on descriptor information acquired through the acquired image of each position, and convert descriptors included in the same group into lower representative descriptors according to a predetermined sub-representative rule. As another example, the position recognition unit 5240 may classify all descriptors collected from acquired images in a predetermined area, such as a room, into a plurality of groups according to a predetermined sub-classification rule, and convert descriptors included in the same group into sub-representative descriptors according to the predetermined lower representative rule.

The position recognition unit 5240 may obtain a feature distribution of each position through the above process. Each position feature distribution can be represented by a histogram or an n-dimensional vector. As another example, the learning module 143 may estimate an unknown current position based on a descriptor calculated from each feature without passing through a predetermined sub-classification rule and a predetermined sub-representative rule.

In addition, if the current position of the robot cleaner 51 becomes unknown due to a position leap or the like, the position recognition unit 5240 may estimate the current position based on previously stored descriptors or sub-representative descriptors.

The position recognition unit 5240 acquires an acquired image through the image acquisition unit 5140 at an unknown current position, and detects features from the acquired image if various features such as lights disposed on the ceiling, edges, corners, blobs, and ridges are identified through the image.

Based on at least one piece of recognition descriptor information acquired from the acquired image at the unknown current position, the position recognition unit 5240 performs conversion into information (sub-recognition feature distribution) to be comparable with position information (for example, the feature distribution of each position) to be compared according to a predetermined sub-conversion rule. According to a predetermined sub-comparison rule, each position feature distribution may be compared with each recognition feature distribution to calculate each similarity. A similarity (probability) may be calculated for each position, and a position where the greatest probability is calculated may be determined as the current position.

If the map is updated by the map generation unit 5220 during traveling, the control unit 5200 transmits the updated information to the air cleaner 300 through the communication unit, so that the maps stored in the air cleaner and the robot cleaner 51 are the same.

If the cleaning command is input, the traveling control unit 5230 controls the driving unit to move to the designated area among the cleaning areas, and operates the cleaning unit to perform cleaning with traveling.

If the cleaning command is input with respect to a plurality of areas, the traveling control unit 5230 may perform cleaning by moving areas according to whether a priority area is set or in a designated order. If no separate order is specified, the traveling control unit 5230 performs cleaning by moving to a near area or an adjacent area based on the distance from the current position.

In addition, if the cleaning command for an arbitrary area is input regardless of the area classification, the traveling control unit 5230 performs cleaning by moving to the area included in the arbitrary area.

If the virtual wall is set, the traveling control unit 5230 determines the virtual wall and controls the driving unit based on the coordinate value input from the map generation unit 5220.

Even if the obstacle recognition unit 5210 determines that the obstacle does not exist, if the virtual wall is set, the traveling control unit 5230 recognizes that the obstacle exists at the corresponding position and restricts the traveling.

If the virtual wall setting changes during traveling, the traveling control unit 5230 classifies a traveling-possible area and a traveling-impossible area according to the changed virtual wall setting and resets the traveling route.

The traveling control unit 5230 controls the traveling in response to any one of setting 1 for the noise, setting 2 for the traveling route, setting 3 for the avoidance, and setting 4 for the security according to the attribute set to the virtual wall.

The traveling control unit 5230 may access the virtual wall to perform a designated operation according to the attribute of the virtual wall (traveling route, setting 2), may reduce the noise occurring from the main body and then perform cleaning (noise, setting 1), may travel while avoiding the virtual wall without approaching the virtual wall more than a certain distance (avoidance, setting 3), and may capture an image of a predetermined area based on the virtual wall (security, setting 4).

If the cleaning of the set designated area is completed, the control unit 5200 stores the cleaning record in the data unit.

In addition, the control unit 5200 transmits the operation state of the robot cleaner 51 or the cleaning state to the air cleaner through the communication unit 190 at a predetermined cycle.

Based on the data received from the robot cleaner 51, the air cleaner displays the position of the robot cleaner together with the map on the screen of the running application, and also outputs information about the cleaning state.

If the information about the obstacle is added, the air cleaner may update the map based on the received data.

If the cleaning command is input, the robot cleaner may travel while dividing the traveling-possible area and the traveling-impossible area based on the information of the set virtual wall.

Meanwhile, the sensor unit 5150 may include a camera. In addition, the control unit 5200 may control the camera to capture the indoor space to thereby acquire the image of the indoor space.

The sensor unit 5150 may include at least one of a laser sensor, an ultrasonic sensor, an infrared sensor, or a camera. The sensor unit 5150 may generate the map of the indoor space by using at least one of images captured by a laser, an ultrasonic wave, an infrared ray, and a camera.

In addition, the sensor unit 5150 may include a temperature sensor for measuring the temperature of the indoor space, a first heat sensor (e.g., an infrared sensor) for detecting the body temperature of the user, and a second heat sensor for detecting heat generation information such as the operation state of the gas range or the electric range, or heat generation of the electronic product.

In addition, the sensor unit 5150 may include a microphone for receiving sound.

In addition, the sensor unit 5150 may include a dust sensor for detecting the amount of dusts in the air and a gas sensor for detecting the amount of gas in the air.

Figure 5A:
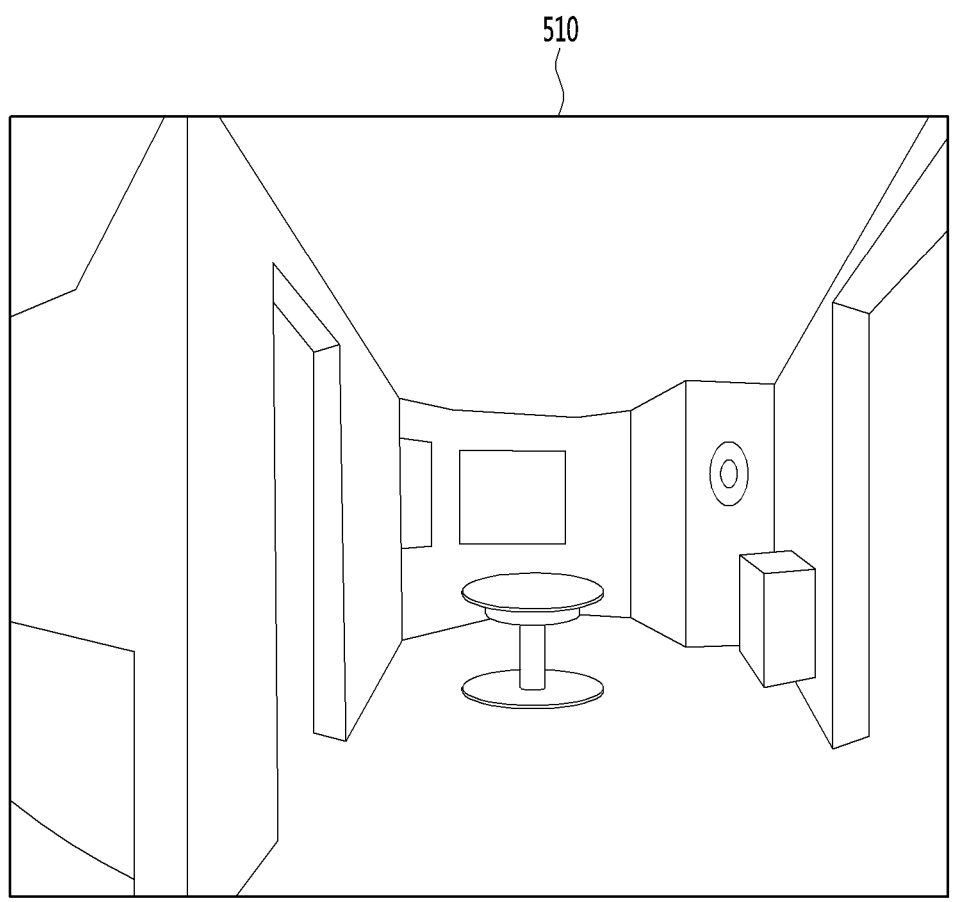
FIGS. 5A, 5B, and 5C are diagrams for describing a method for generating a map of an indoor space according to an embodiment of the present invention.
Figure 5B:
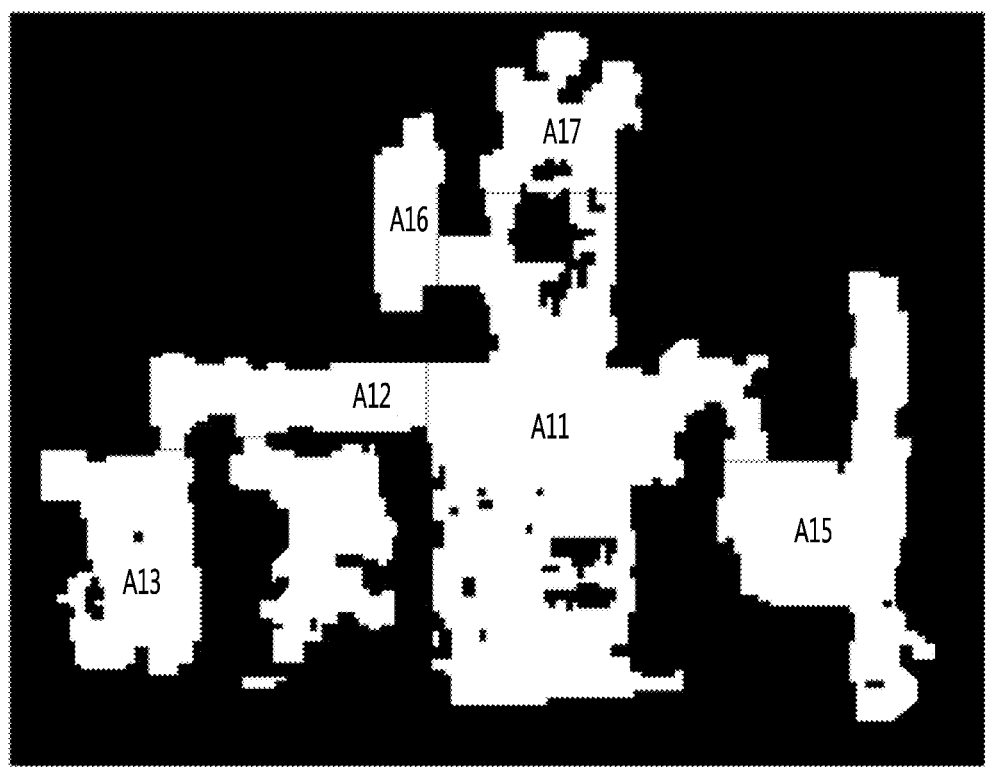
Figure 5C:

FIGS. 5A to 5C are diagrams for describing a method for generating a map of an indoor space according to an embodiment of the present invention.

Hereinafter, the term "robot cleaner" may be used interchangeably with the term "moving agent".

The moving agent may collect information for generating the map of the indoor space while moving the indoor space.

For example, as illustrated in FIG. 5A, the moving agent may capture a plurality of images 510 with a camera while moving the indoor space. However, the image is only one example of information for generating the map of the indoor space, and the moving agent may collect sensing information for generating the map of the indoor space by using radar, infrared rays, and ultrasonic waves.

Meanwhile, the moving agent may acquire an image of an air conditioner disposed in the indoor space.

Meanwhile, the moving agent may generate the map of the indoor space by using the collected information.

For example, as illustrated in FIG. 5B, the moving agent may generate the map composed of outlines of the indoor space. In this case, the map may be divided into a plurality of areas A11 to A17, for example, a living room, a room 1, a room 2, and the like.

Meanwhile, the moving agent may acquire the image of the air conditioner disposed in the indoor space, and display the position and the direction of the air conditioner on the map based on the image of the air conditioner.

The map of the indoor space may include a processed map.

In detail, the moving agent may generate the processed map that simplifies the structure of the indoor space by using the map of the indoor space so that the structure of the indoor space can be easily recognized.

More specifically, as illustrated in FIG. 5C, the moving agent may simplify the shape of the area to arrange obstacles or straighten walls.

Meanwhile, the moving agent may display the position and direction of the air conditioner on the processed map.

Meanwhile, the control unit 200 of the moving agent may transmit feature information about the structure of the indoor space to the air conditioner 700 through the communication unit 270. The feature information may be information collected through the sensor unit 5150 so as to generate the map of the indoor space, a map generated using the information collected through the sensor unit 5150, or a processed map simplifying the structure of the indoor space.

Meanwhile, the processor 780 of the air conditioner 700 may receive feature information about the structure of the indoor space acquired by the moving agent through the communication unit 5270.

Meanwhile, if the information collected so as to generate the map of the indoor space is received as feature information, the processor 780 of the air conditioner 700 may generates the map of the indoor space by using the information collected so as to generate the map of the indoor space. In this case, the above-described method by which the moving agent generates the map may be used.

Meanwhile, the robot cleaner 51 may include the configuration of the AI device 100 and the learning device 200 described above, and may perform the corresponding functions.

In addition, the term "robot cleaner 51" may be used interchangeably with the term "AI robot cleaner 51."

Figure 6:
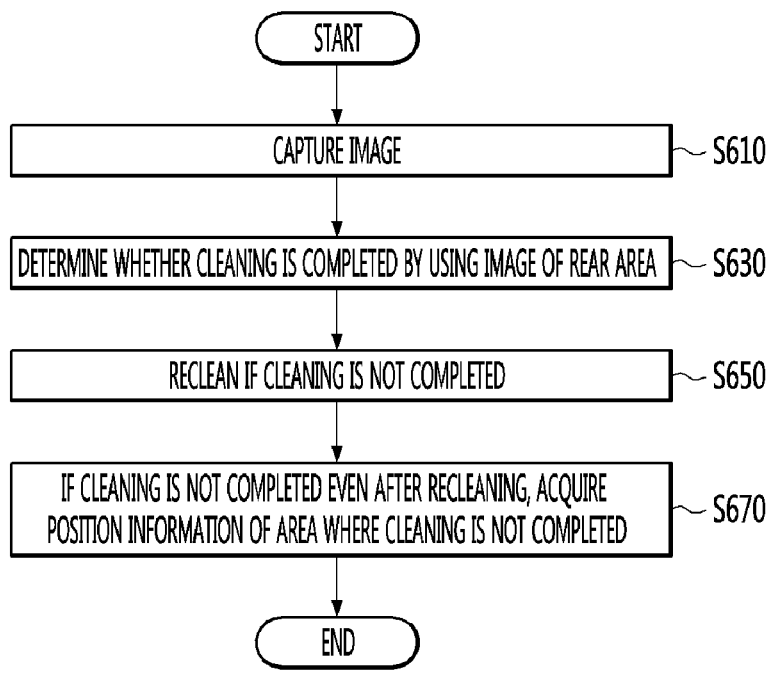
FIG. 6 is a diagram for describing a method for operating a robot cleaner according to an embodiment of the present invention.

FIG. 6 is a diagram for describing a method for operating a robot cleaner according to an embodiment of the present invention.

A method for operating a robot cleaner according to an embodiment of the present invention may include: capturing an image (S610); determining whether cleaning of an already cleaned area is completed by using an image of a rear area of the robot cleaner (S630); if the cleaning is not completed, controlling a driving unit and a cleaning unit to reclean an area where the cleaning is not completed (S650); and if the cleaning is not completed even after the recleaning step (S670), acquiring position information of the area where the cleaning is not completed (S670).

Figure 7:
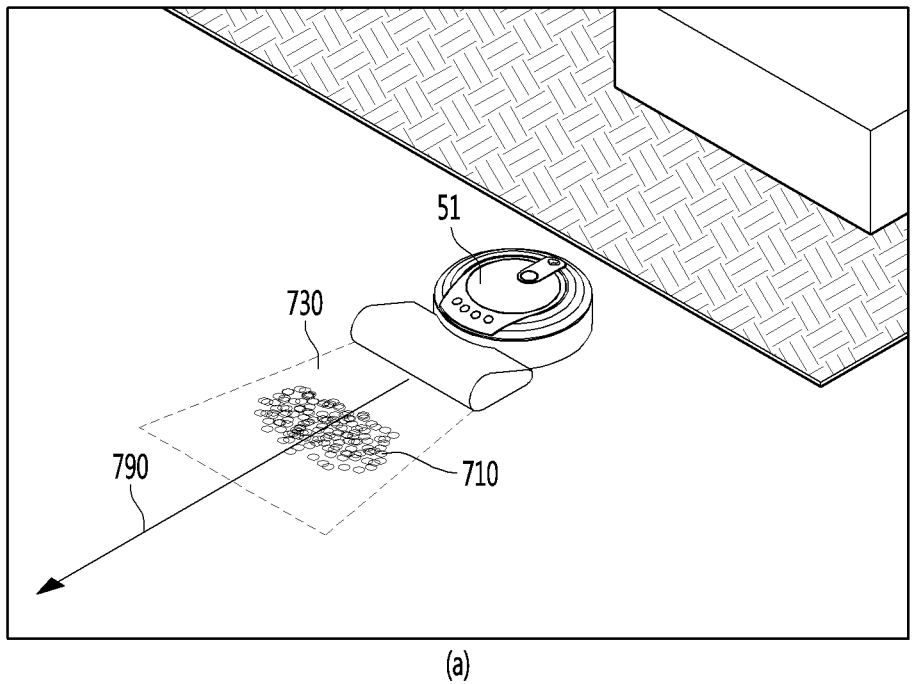
FIG. 7 is a diagram for describing a situation in which the cleaning is not completed if the robot cleaner performs the cleaning.
Figure 7:
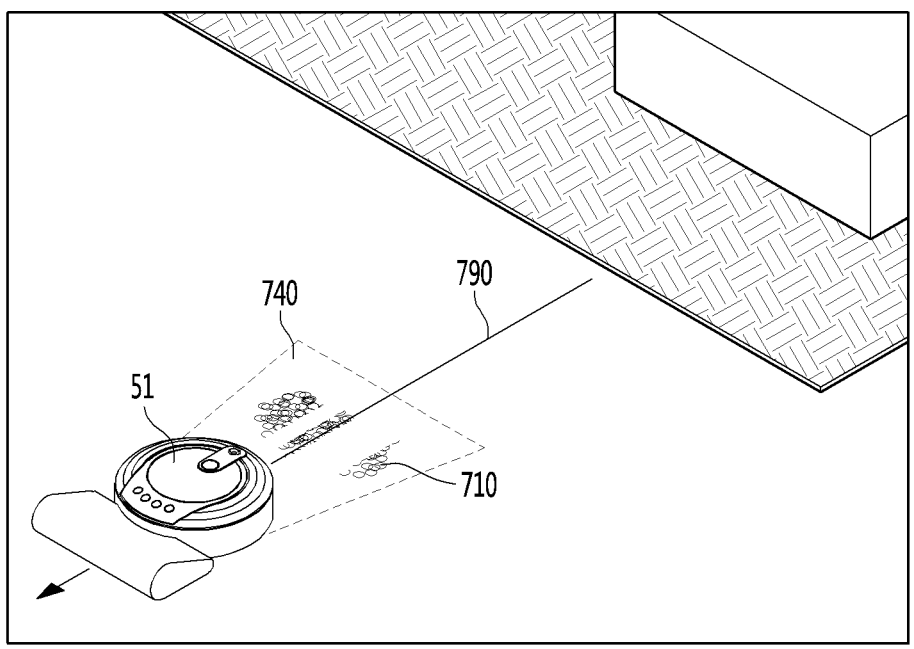

FIG. 7 is a diagram for describing a situation in which the cleaning is not completed if the robot cleaner performs the cleaning.

The driving unit 250 of the robot cleaner may drive the robot cleaner under the control of the processor 180. In addition, the cleaning unit 260 may perform cleaning (remove contaminants) under the control of the processor 180.

Referring to FIG. 7A, the processor of the robot cleaner 51 may control the driving unit 250 and the cleaning unit 260 to perform cleaning while moving the robot cleaner 51 along the traveling route 790.

In addition, referring to FIG. 7A, the contaminant 710 is positioned on the traveling route 790 of the robot cleaner 51. In addition, the processor 180 may control the cleaning unit 260 to remove the contaminant 710 on the traveling route 790.

Meanwhile, referring to FIG. 7B, the robot cleaner 51 moves while cleaning the contaminant 710 on the traveling route 790.

However, since the cleaning is not performed properly, the residual contaminant 720 of the contaminant 710 remains. That is, a state in which the robot cleaner performs the cleaning but the residual contaminant 720 remain may be referred to as an area where the cleaning is not completed.

Meanwhile, the robot cleaner may include a front camera for photographing a front area 730 of the robot cleaner and a rear camera for photographing a rear area 740 of the robot cleaner.

The front area 730 may mean a floor area in front of the robot cleaner. The rear area 740 may mean a floor area behind the robot cleaner.

Meanwhile, the already cleaned area in the present specification may mean an area where the robot cleaner moves and performs an operation for removing contaminant.

In addition, the completion of the cleaning in the present specification may mean that the robot cleaner performs an operation for removing contaminants while moving, and no residual contaminants remain as the contaminants are removed.

In addition, the expression "the cleaning is not completed" in the present specification may mean that the robot cleaner performs an operation for removing contaminants while moving, but residual contaminants remain.

In addition, the expression "the area where the cleaning is not completed" in this specification may mean an area where the robot cleaner performs a cleaning operation by the cleaning unit 260 while moving, but residual contaminants remain.

Meanwhile, the processor may determine whether the cleaning of the already cleaned area is completed by using the image of the rear area of the robot cleaner. This will be described below with reference to FIG. 8.

Figure 8:
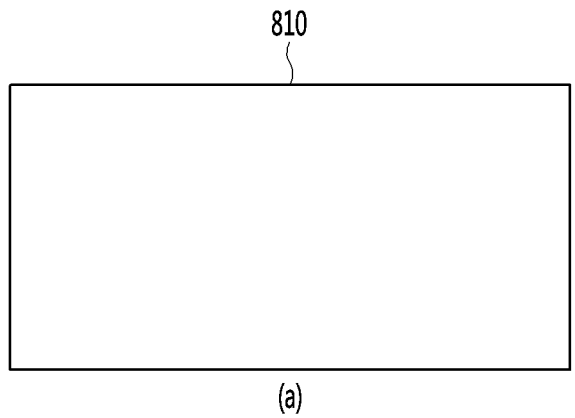
FIG. 8 is a diagram for describing a method for determining non-completion of cleaning according to an embodiment of the present invention.
Figure 8:
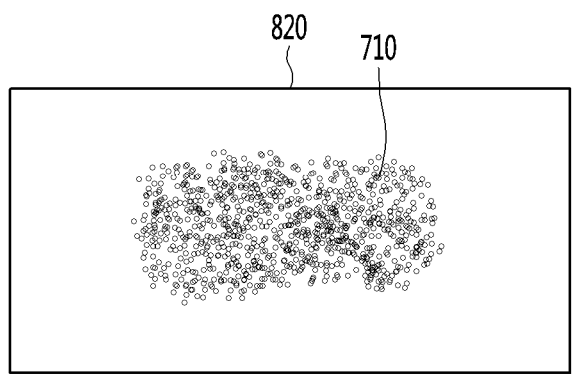
Figure 8:
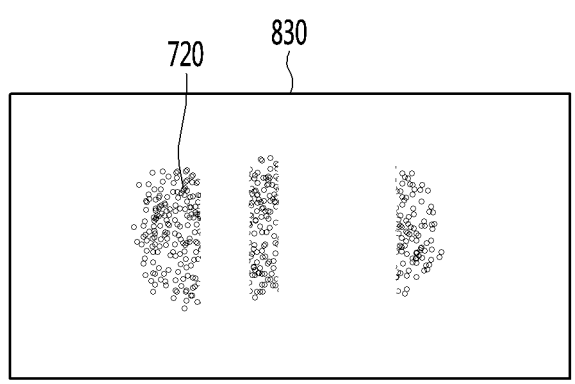

FIG. 8 is a diagram for describing a method for determining non-completion of cleaning according to an embodiment of the present invention.

In the present invention, four methods for determining whether the cleaning is completed will be described.

In a first method, the processor may determine whether the robot cleaner has completed the cleaning by using the image 830 of the rear area and the background image 810 corresponding to the image of the rear area.

The background image 810 may be an image obtained if the robot cleaner photographs the cleaning area (more specifically, the floor of the cleaning area) while moving the cleaning area. In this case, the background image 810 may be photographed in advance and stored in the memory of the robot cleaner.

In addition, the background image 810 corresponding to the image of the rear area may mean a background image having the same position information as the image 830 of the rear area. For example, if the image 830 of the rear area is an image of a specific position in the cleaning area, the background image 810 corresponding to the image of the rear area may also be an image of a specific position in the cleaning area.

In this case, the processor 180 may acquire position information of the background image along with the background image. In addition, the processor 180 may acquire position information of the image of the rear area together with the image of the rear area. The processor 180 may determine whether the cleaning is completed by comparing the image 830 of the rear area with the background image 810 having the same position information as the image of the rear area.

Meanwhile, if contaminant not included in the background image is included in the image of the rear area, the processor may determine that the cleaning is not completed.

In more detail, if the contaminant does not exist, no contaminant exists in the background image 810.

Since the robot cleaner removes contaminants while moving, but the residual contaminants remain, the residual contaminants 720 are present in the image 830 of the rear area.

If the contaminants 720 not included in the background image are included in the image of the rear area, the processor may determine that cleaning is not completed.

Meanwhile, if the contaminants 720 not included in the background image are not included in the image of the rear area, that is, if the background image and the image of the rear area are the same, the processor may determine that cleaning is completed.

In a second method, the processor may determine whether the cleaning is completed by using the image of the front area of the robot cleaner and the image of the rear area after the robot cleaner passes through the front area.

In detail, at the position of FIG. 7A, the processor may capture the image of the front area 730 in which the contaminant 710 is present. Therefore, the contaminant 710 may be included in the image of the front area 730. In addition, the robot cleaner cleans the contaminant 710 and passes through the front area 730 where the contaminant 710 is present.

FIG. 7B illustrates a state in which the robot cleaner passes through the contaminant 710. The processor may capture the image of the rear area 740 in a state in which the robot cleaner passes through the front area 730 (or the contaminant 710). Since the residual contaminants 720 is present in the rear area 740, the residual contaminant 720 may be included in the image of the rear area 740.

The processor may determine whether the cleaning is completed by comparing the image 820 of the front area 730 with the image 830 of the rear area 740 after the robot cleaner passes through the front area.

In more detail, the processor may acquire the image obtained by fragmenting the image of the contaminant 710 included in the image 820 of the front area. The term "fragmentation" may be used interchangeably with the term "image fragmentation."

The fragmentation of the image may mean dividing the image of the contaminant in various methods. The processor may fragment the image of the contaminant 710 included in the image 820 of the front area to obtain one or more fragmented images.

The reason for fragmentation of the image of the contaminant is that the residual contaminant 720 generated if the cleaning of the contaminant 710 is not properly performed has a form similar to that of the image obtained by fragmenting the image of the contaminant 710.

Therefore, if one or more images obtained by fragmenting the image of the contaminant 710 included in the image 820 of the front are 730 are acquired and the fragmented image corresponds to the residual contaminant 720 included in the image 830 of the rear area 740, the processor may determine that the cleaning is not completed. That the fragmented image corresponds to the residual contaminant 720 included in the image 830 of the rear area 740 may mean that the similarity between the fragmented image and the residual contaminant 720 is greater than or equal to a predetermined value.

Meanwhile, if the fragmented image does not correspond to the image 830 of the rear area 740, the processor may determine that the cleaning is completed.

A third method for determining whether the cleaning is completed will be described below.

In a third method, the processor may determine whether the cleaning is completed by using the image of the front area of the robot cleaner, the image of the rear area after the robot cleaner passes through the front area, and the background image.

In detail, the background image 810 may be captured in advance and stored in the memory of the robot cleaner.

In addition, in the position of FIG. 7A, the processor may capture the image of the front area 730 in which the contaminant 710 is present. In addition, referring to FIG. 7B, the processor may capture the image of the rear area 740 in a state in which the robot cleaner passes through the front area 730 (or the contaminant 710).

The processor may determine whether the cleaning is completed by using the image of the front area of the robot cleaner, the image of the rear area after the robot cleaner passes through the front area, and the background image.

Specifically, if the contaminant not included in the background image is included in the image of the rear area and the image obtained by fragmenting the image of the contaminant included in the image of the front area corresponds to the residual contaminant included in the image of the rear area, the processor may determine that the cleaning is not completed.

That is, the third method is a combination of the first method and the second method, and can further improve the accuracy in determining whether the cleaning is not completed.

A fourth method for determining whether the cleaning is completed will be described below.

In a fourth method, if the contaminant is included in the image obtained by photographing the front area, the processor may control the rear camera to photograph the rear area.

In detail, the processor may determine whether the cleaning is completed by using the image of the front area of the robot cleaner, the image of the rear area after the robot cleaner passes through the front area, and the background image.

More specifically, the processor may control the front camera to photograph the front area. If the contaminant is included in the image obtained by photographing the front area, the processor may control the rear camera to photograph the rear area.

In addition, the processor may determine whether the cleaning is completed by using the image of the rear area after the robot cleaner passes through the front area and the background image corresponding to the image of the rear area.

In detail, if contaminant not included in the background image is included in the image of the rear area, the processor may determine that the cleaning is not completed.

The fourth method has an advantage that can reduce power consumption because photography is performed by the rear camera only if contaminant is present in the front. In addition, as an example of the fourth method, the comparison between the image of the rear area and the background image has been described, but the present invention is not limited thereto. The fourth method may be performed by comparing the image obtained by photographing the rear area with the fragmented image.

Figure 9:
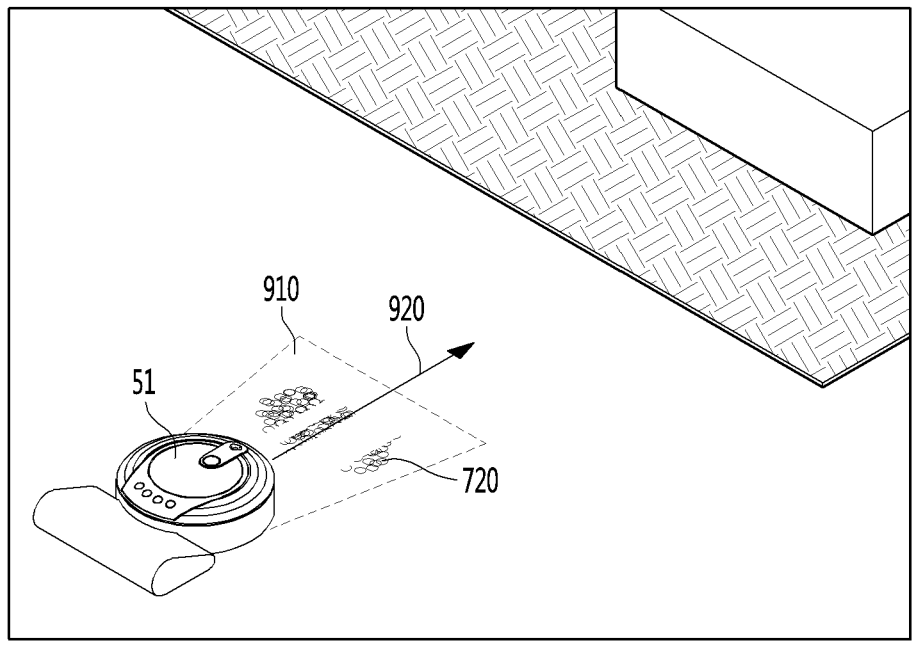
FIG. 9 is a diagram for describing a method for performing recleaning if the cleaning is not completed, according to an embodiment of the present invention.
Figure 9:
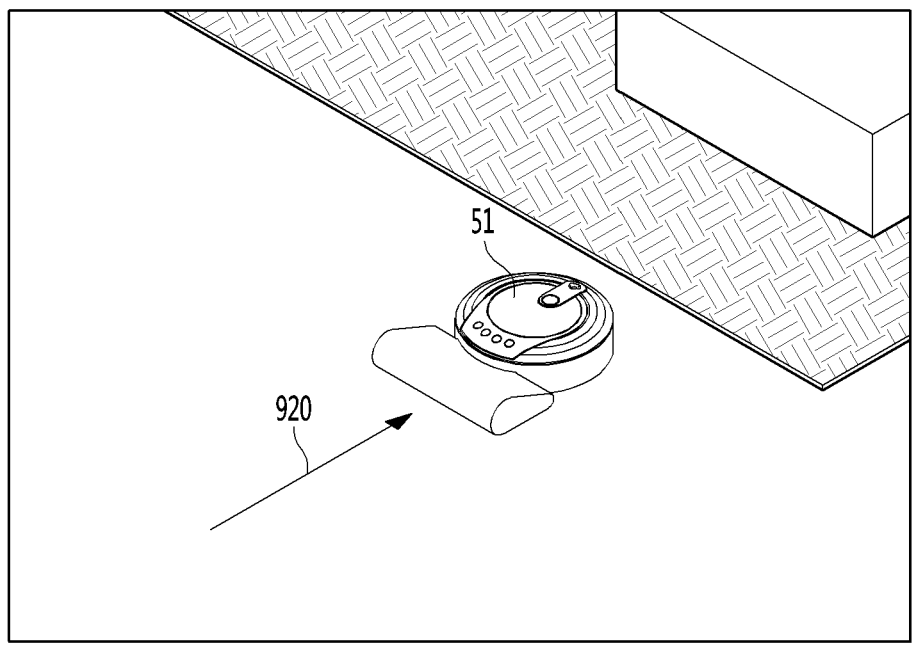

FIG. 9 is a diagram for describing a method for performing recleaning if the cleaning is not completed, according to an embodiment of the present disclosure.

The processor may control the driving unit and the cleaning unit to move the robot cleaner to the area 910 in which the cleaning is not completed and perform cleaning.

That is, according to the present invention, since the robot cleaner moves to an area where cleaning is not performed properly and performs recleaning, there is an advantage that the area becomes cleaner.

In this case, the processor may control the driving unit so that the robot cleaner moves backward to move to the area where cleaning is not completed.

Specifically, an example in which the driving unit includes at least one driving motor and the robot cleaner is moved by the rotation of the driving motor has been described.

The processor may control the driving unit to rotate the driving motor in the reverse direction. In this case, the robot cleaner may move backward and move in the reverse direction 9520 of the moving route.

While the robot cleaner moves backward, the processor may control the cleaning unit to remove contaminants.

In other words, according to the present invention, since the robot cleaner moves backward to the area where the cleaning is not properly performed, and performs the recleaning, there is an advantage that can perform the recleaning while minimizing the moving distance.

Meanwhile, the recleaning may be performed a plurality of number of times.

In detail, the processor may control the driving unit so that the robot cleaner repeatedly moves forward and backward and passes through the area where the cleaning is not completed a plurality of number of times. While the robot cleaner passes through the area where the cleaning is not completed a plurality of number of times, the processor may control the cleaner to remove residual contaminants.

That is, according to the present invention, since the robot cleaner performs the recleaning by repeating the forward and backward movements in the area where the cleaning is not performed properly, there is an advantage that can completely remove the contaminants while minimizing the moving distance.

Meanwhile, the processor may determine the cleaning mode according to the state of the contaminant and perform the recleaning according to the determined cleaning mode.

This will be described below with reference to FIG. 10.

Figure 10:
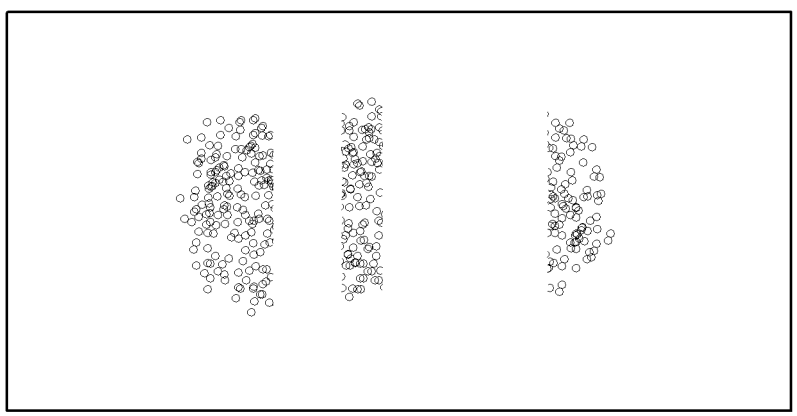
FIG. 10 is a diagram for describing a method for determining a cleaning mode according to a contaminant state and performing recleaning according to the determined cleaning mode, according to an embodiment of the present invention.
Figure 10:
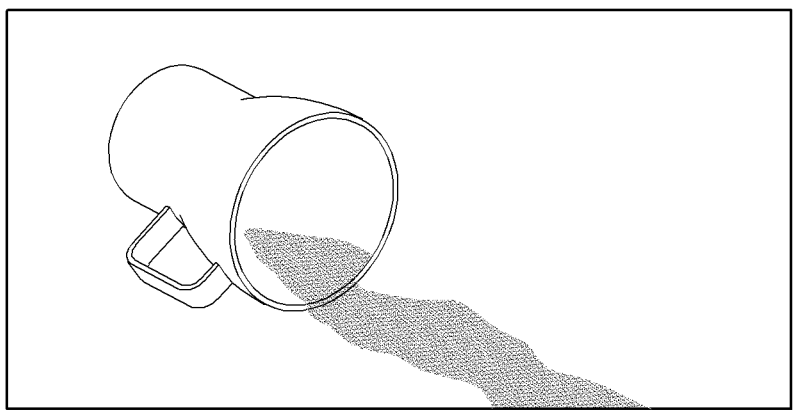

FIG. 10 is a diagram for describing a method for determining a cleaning mode according to a contaminant state and performing recleaning according to the determined cleaning mode, according to an embodiment of the present invention.

In general, the robot cleaner performs the cleaning by operating the suction device, assuming that the contaminant is dust or foreign substance as shown in FIG. 10A.

However, if the contaminant is stains due to liquid or the like as shown in FIG. 10b, the contaminant is not removed despite the operation of the suction device.

Therefore, the robot cleaner may determine the cleaning mode according to the state of the contaminant.

In detail, the robot cleaner may include a contaminant state determination unit.

The contaminant state determination unit may acquire data for determining the state of the contaminant and whether the contaminant is a liquid or a solid.

In detail, the contaminant state determination unit may include a radar transceiver. At least one of the reflectance or the reflection speed of the radar signal may be changed according to the state of the contaminant, that is, whether the contaminant is a liquid or a solid.

Therefore, the processor may acquire at least one of the reflectance or the reflection speed of the radar signal by using the data acquired from the contaminant state determination unit, and may acquire the state of the contaminant by using at least one of the reflectance or the reflection speed of the radar signal.

The processor may determine the cleaning mode according to the state of the contaminant, and control the driving unit and the cleaning unit to reclean the area where the cleaning is not completed, according to the determined cleaning mode.

Specifically, if the contaminant is a solid, the processor may determine the cleaning mode as a suction mode. In addition, the processor may control the driving unit and the cleaning unit to suction back the contaminant of the area where the cleaning is not completed, according to the suction mode.

Meanwhile, if the contaminant is a liquid, the processor may determine the cleaning mode as a steam mode. The processor may control the driving unit and the cleaning unit to remove contaminants in the area where the cleaning is not completed, according to the steam mode. To this end, the cleaning unit may further include a steam generator.

Meanwhile, it has been described that the state of the contaminant is determined by using the radar transceiver, but the present invention is not limited thereto.

In detail, the contaminant state determination unit may include a camera. In this case, the processor may determine the state of the contaminant by using an image captured by the camera.

In this case, the processor may determine the state of the contaminant by using an artificial neural network.

Specifically, the learning device may train the artificial neural network by using a plurality of training data (images of liquid contaminants, images of solid contaminants) and labeling data (liquid or solid) that are labeled in the training data.

The labeling data (liquid or solid) may mean an answer that the artificial neural network should predict.

The trained artificial neural network can be mounted on the robot cleaner.

If the processor inputs the image captured by the camera to the trained artificial neural network, the processor may output information about whether the contaminant included in the image is a solid or a liquid.

Meanwhile, an example in which the cleaning mode is changed according to the state of the contaminant has been described, but the present invention is not limited thereto. The cleaning mode may be changed according to the type of the floor.

In detail, the processor may determine the type of the floor (e.g., marble, carpet, wood, hardwood, etc.) by using the image captured by the camera. The processor may perform the cleaning in the cleaning mode corresponding to the type of the floor.

Figure 11:
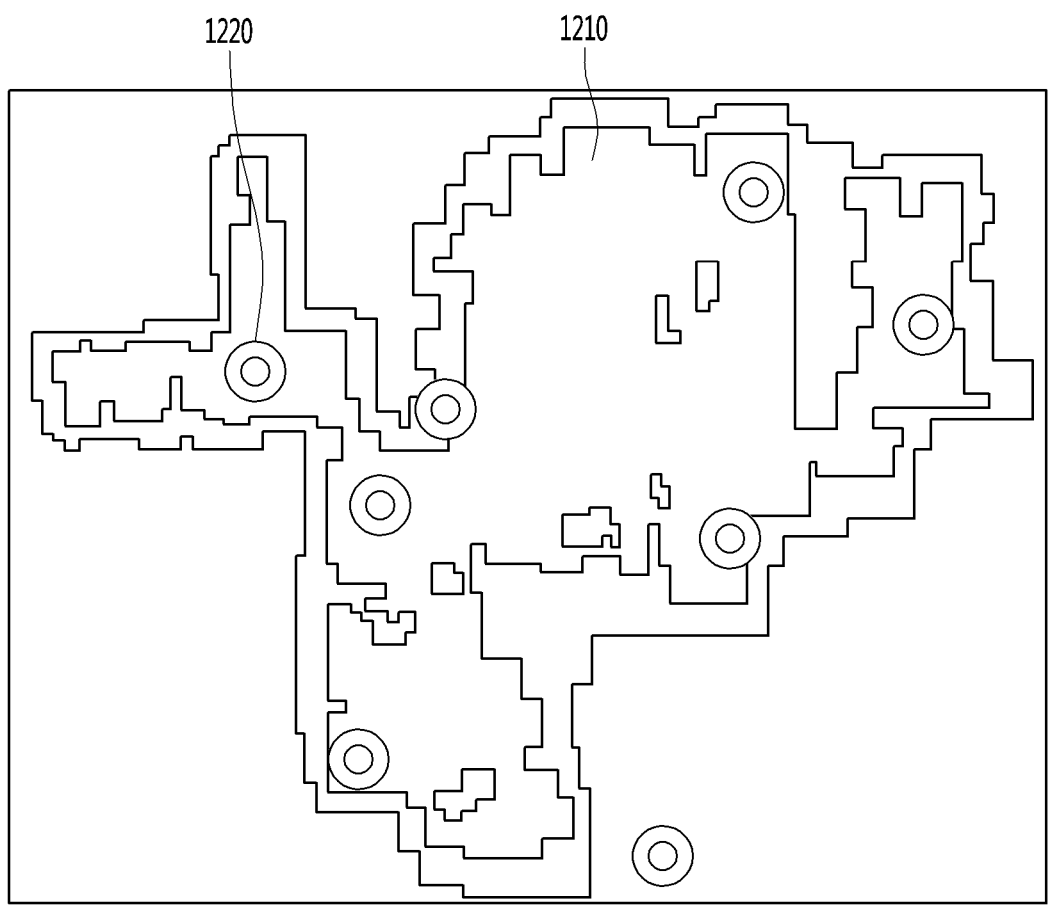
FIG. 11 is a diagram for describing an operation if the cleaning is not completed in spite of recleaning according to an embodiment of the present invention.

FIG. 11 is a diagram for describing an operation if the cleaning is not completed in spite of the recleaning according to an embodiment of the present invention.

The processor may reclean the area where the cleaning is not completed. If the area where the cleaning is not completed is recleaned but the cleaning of the recleaned area is not completed, the processor may acquire position information of the recleaned area.

In particular, even if the area where the cleaning is not completed is recleaned, residual contaminants may still remain in the recleaned area. The processor may determine whether the cleaning of the recleaned area is completed by using the image captured after the recleaning. If the cleaning of the recleaned area is not completed, the processor may acquire position information of the recleaned area.

Meanwhile, if the area where the cleaning is not completed is recleaned more than a predetermined number of times and the cleaning of the cleaned area is not completed after recleaning more than the predetermined number of times, the processor may stop recleaning and acquire position information of the recleaned area.

For example, the processor may control the driving unit so that the robot cleaner repeatedly moves forward and backward so as to pass five times through the area where the cleaning is not completed. While the robot cleaner passes five times through the area where the cleaning is not completed, the processor may control the cleaning unit to perform recleaning of the area where the cleaning is not completed, that is, to remove residual contaminants.

In addition, the processor may determine whether the cleaning of the recleaned area is completed by using the image captured after performing the recleaning five times. If the cleaning of the recleaned area is not completed, the processor may acquire position information of the recleaned area.

If the position information is acquired, the processor may display a map 1210 of the cleaning area and display a UI element 1220 indicating the position information of the recleaned area on the map 1210 of the cleaning area.

In addition, if the position information is acquired, the processor may transmit the position information to the user's terminal. In this case, the user's terminal may display the map 1210 of the cleaning area and display the UI element 1220 indicating the position information of the recleaned area on the map 1210 of the cleaning area.

That the contaminants remain despite recleaning may mean that the contaminants cannot be removed by the cleaning using the robot cleaner.

In this case, the robot cleaner may prevent unnecessary energy consumption and increase in the cleaning time by stopping recleaning after recleaning a predetermined number of times, instead of repeating cleaning indefinitely.

In addition, according to the present invention, by providing the user with the position at which the removal of the contaminant is impossible, there is an advantage that can guide the user to directly clean the area where the contaminants remain.

According to the present invention, since the robot cleaner moves to an area where cleaning is not performed properly and performs recleaning, there is an advantage that the area becomes cleaner.

According to the present invention, since the robot cleaner performs recleaning while repeating forward and backward movements in the areas where the cleaning is not performed properly, there is an advantage that contaminants can be completely removed while minimizing the traveling distance.

The present invention may be embodied as computer-readable codes on a program-recorded medium. The computer-readable recording medium may be any recording medium that stores data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the control unit 180 of the terminal. Therefore, the above description is illustrative and should not be construed as limited in all aspects. The scope of the present invention should be determined by reasonable interpretation of the appended claims, and all changes within the equivalent scope of the present invention falls within the scope of the present invention.

What is claimed is:

1. An artificial intelligence robot cleaner comprising:
a memory configured to store a background image obtained by photographing a floor of a cleaning area and position information of the background image;
a driver configured to drive the artificial intelligence robot cleaner;
a cleaner configured to remove contaminant;
a front camera configured to photograph a front area of the artificial intelligence robot cleaner;
a rear camera configured to photograph a rear area of the artificial intelligence robot cleaner; and
a processor configured to:
determine whether cleaning of an already cleaned area is completed based on an image of the front area of the artificial intelligence robot cleaner, an image of the rear area after the artificial intelligence robot cleaner passes through the front area, and the background image; and
based on a determination that the cleaning is not completed, control the driver and the cleaner to reclean the area where the cleaning is not completed,
wherein determining whether the cleaning is completed comprises:
acquiring position information of the image of the rear area; and
determining that the cleaning is not completed based on:
contaminant being included in the image of the rear area that is not included in the background image stored in the memory, wherein a position information of the background image is the same as the acquired position information of the image of the rear area; and
contaminant being included in the image of the front area and being included in the image of the rear area.

2. The artificial intelligence robot cleaner according to claim 1, wherein the processor is configured to:
acquire a fragmented image obtained by fragmenting an image of contaminant included in the image of the front area; and
determine that the cleaning is not completed, if the fragmented image corresponds to a residual contaminant included in the image of the rear area.

3. The artificial intelligence robot cleaner according to claim 1,
wherein the processor is configured to control the rear camera to photograph the rear area, if contaminant is included in the image obtained by photographing the front area.

4. The artificial intelligence robot cleaner according to claim 1, wherein the processor is configured to control the driver and the cleaner to move to the area where the cleaning is not completed and perform cleaning.

5. The artificial intelligence robot cleaner according to claim 4, wherein the processor is configured to control the driver so that the robot cleaner moves backward to move to the area wherein the cleaning is not completed.

6. The artificial intelligence robot cleaner according to claim 1, further comprising a contaminant state determinator,
wherein the processor is configured to:
determine a cleaning mode according to a state of the contaminant; and
control the driver and the cleaner to reclean the area where the cleaning is not completed, according to the determined cleaning mode.

7. The artificial intelligence robot cleaner according to claim 1, wherein the processor is configured to:
reclean the area where the cleaning is not completed more than a predetermined number of times; and
acquire position information of the recleaned area if the cleaning of the recleaned area is not completed after the recleaning is performed the predetermined number of times or more.

* * * * *